(12) United States Patent
Taniguchi et al.

(10) Patent No.: US 7,677,616 B2
(45) Date of Patent: Mar. 16, 2010

(54) BUMPER ABSORBER

(75) Inventors: Takahiko Taniguchi, Nagoya (JP); Seiho Yonezawa, Toyota (JP); Soshi Mitsuyama, Toyota (JP); Hiroyasu Miyamoto, Aichi-ken (JP)

(73) Assignees: Hayashi Telempu Co., Ltd., Nagoya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/038,244

(22) Filed: Feb. 27, 2008

(65) Prior Publication Data

US 2008/0217936 A1 Sep. 11, 2008

(30) Foreign Application Priority Data

Mar. 1, 2007 (JP) ............... 2007-051415

(51) Int. Cl.
  *B60R 19/34* (2006.01)
(52) U.S. Cl. .......... 293/133; 293/102; 293/132
(58) Field of Classification Search ........ 296/102, 296/132, 133, 135, 136; 293/102, 132, 133, 293/135, 136
  See application file for complete search history.

(56) References Cited

U.S. PATENT DOCUMENTS

2007/0182172 A1* 8/2007 Hasegawa ............ 293/102

FOREIGN PATENT DOCUMENTS

| EP | 1 378 403 A1 | 1/2004 |
|---|---|---|
| EP | 1 410 954 A1 | 4/2004 |
| EP | 1 800 961 | 6/2007 |
| GB | 2 367 789 | 4/2002 |
| JP | 61-188253 | 8/1986 |
| JP | 3-40266 | 4/1991 |
| JP | 2001-260774 | 9/2001 |
| JP | 2003-341449 | 12/2003 |
| JP | 2004-136873 | 5/2004 |
| JP | 2004-175338 | 6/2004 |
| JP | 2005-536392 | 12/2005 |
| JP | 2006-123679 | 5/2006 |
| JP | 2007-022371 | 2/2007 |
| WO | WO 2004/018261 | 3/2004 |

* cited by examiner

*Primary Examiner*—Lori L Lyjak
(74) *Attorney, Agent, or Firm*—Oblon, Spivak, McClelland, Maier & Neustadt, L.L.P.

(57) ABSTRACT

A bumper absorber includes an upper leg and a lower leg, each of which extends in a longitudinal direction of an automobile, and a spanning portion. The spanning portion connects the upper leg and the lower leg, and faces an outer surface side of the bumper absorber in a longitudinal direction of the automobile. Each of the upper leg and the lower leg includes a buckling inductive portion that serves as a starting point of the buckling that is caused when the spanning portion receives an impact load. The buckling inductive portion is formed as an angular transition portion in which the angle of inclination between inner side surfaces changes. The inner side surfaces mutually face between the upper leg and the lower leg that include the buckling inductive portion.

5 Claims, 8 Drawing Sheets

BUMPER ABSORBER

BACKGROUND OF THE INVENTION

1. Field of the Invention

The present invention relates to a bumper absorber disposed in a bumper system of an automobile.

2. Description of the Related Art

Heretofore, a bumper system, whose purpose is to protect an automobile body and to suppress injuries of an occupant and a collided object at the collision time, is provided at a front side and a rear side of an automobile. In recent years, the bumper system particularly has been designed to protect against bodily injuries, in which the load applied to legs of a pedestrian is reduced, thereby reducing injury values of the pedestrian.

The bumper system is usually constituted by a bumper fascia, a bumper reinforce and a bumper absorber.

The bumper reinforce is fitted to the automobile body to reinforce and protect the automobile body. Generally, the bumper reinforce is required to have a predetermined strength, and is made of metal, and has a hollow cylindrical structure in which partition walls for reinforcing are formed.

The bumper absorber is disposed outside the bumper reinforce, and is deformed or crushed between the collided object such as legs of the pedestrian and the bumper reinforce at the time of crash. Thus, the bumper absorber absorbs impact energy, and in particular, works to reduce the reaction force toward the collided object. In general, the bumper absorber is made of soft resin foam, soft resin particle foam compact, hollow resin compact and the like.

The bumper fascia covers and conceals the bumper reinforce and the bumper absorber from the exterior of the automobile body, and improves the design of the automobile body. Furthermore, the bumper fascia protects this bumper absorber from the external environment and works to prevent the performance of the bumper absorber from deteriorating. In general, the bumper fascia is formed such that synthetic resin and the like are injection-molded.

The bumper reinforce also functions as a mount for the bumper absorber and as a pedestal when the bumper absorber is crushed and absorbs the impact. In general, the bumper absorber is mounted and fixed on the bumper reinforce so that a convex portion protrudingly formed in the bumper absorber fits an aperture provided in the bumper reinforce. However, a method of mounting the bumper absorber is not limited to this form, and a method is also known, in which the bumper absorber is disposed only between the bumper reinforce and the bumper fascia and no particular fixing means is used.

Figure 1:
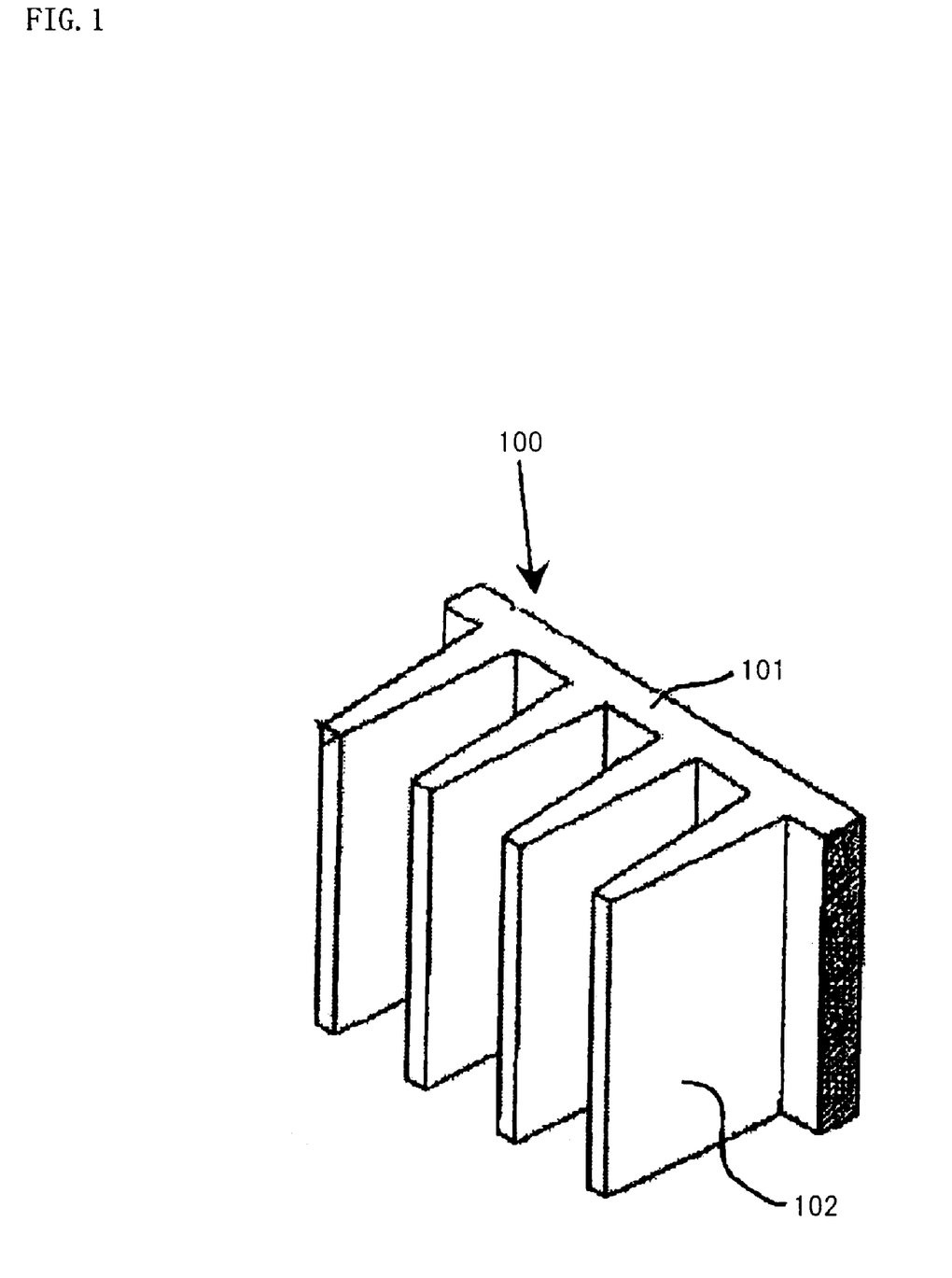
FIG. 1 is a perspective view showing a related art of a bumper absorber.

As such a bumper absorber, JP-A-2003-341449 discloses impact absorption member 100 formed by foam-molding a thermoplastic resin and having a structure as shown in FIG. 1. As shown in the figure, this impact absorption member 100 includes base 101 and a plurality of ribs 102. Ribs 102 are formed on at least one surface side of this base 101, and protrude in the same direction as the direction of the action of the impact load acting on impact absorption member 100. In this patent document, it is described that the rapid increase of compression stress can be suppressed by the provision of such ribs 102 even when the compress strain of impact absorption member 100 is large. Further, it is described that ribs 102 are formed such that those widths are gradually reduced in a tapered shape from base 101 side to the end sides of ribs 102, thereby enhancing the impact absorption performance of impact absorption member 100.

SUMMARY OF THE INVENTION

The bumper absorber that includes such a rib is ultimately intended to absorb the impact by the buckling of the rib. More specifically, during the progress of the buckling, the reaction force toward the collided object does not become too strong, and in particular, the reaction force can be held to be approximately constant.

However, in the relevant bumper absorber, the fluctuation of the position that serves as a starting point of bending at the buckling time is large. In particular, JP-A-2003-341449 discloses a structure in which a plurality of tapered ribs are disposed in parallel at equal intervals. As a result of the detailed research and experiment by the present inventor et al, it was found that, when the end of the rib is tapered in this manner, the stress is concentrated more on the end side, so that when the bumper absorber receives the impact load, the starting point of the bending of the rib is biased on the end side rather than on the center portion. Namely, in the bumper absorber having the tapered rib as described above, the buckling is liable to occur in the vicinity of the end of the rib.

When the buckling occurs in the vicinity of the end of the rib in this manner, the displacement stroke range that accompanies this buckling [i.e., the crushed amount of the bumper absorber toward the direction of the action of the impact load (i.e., projection direction of the rib)] becomes small. Accordingly, a displacement stroke range in which the reaction force can be set approximately constant becomes relatively small. This means that, in this case, the impact absorption performance cannot be sufficiently improved by the bumper absorber. That is, in order to be able to obtain the maximum amount of impact absorption, it is desired that the maximum displacement stroke that accompanies the buckling be secured at the bumper absorber that is limited in size so that the bumper absorber is disposed in the limited space inside the bumper system.

Moreover, in the related art, there is also a fluctuation in the bending direction of the rib, and this fluctuation causes a possibility that the ribs bend mutually in the approaching direction, thereby causing mutual interference. When the ribs interfere with each other in this manner, the bending is suppressed so that the reaction force toward the collided object increases, thereby causing a possibility that good impact absorption is inhibited.

In view of the above described problems, an object of the present invention is to enhance the impact absorption performance of the bumper absorber by suppressing the fluctuation of the buckling position of the rib provided in the bumper absorber. Another object of the present invention is to enhance the impact absorption performance of the bumper absorber by suppressing the fluctuation of the rib in the bending direction at the buckling time.

In order to achieve the above described objects, the bumper absorber of the present invention is a bumper absorber disposed inside the bumper system of the automobile, and includes the upper and the lower side legs, each of which extends in the longitudinal direction of the automobile, and a spanning portion connecting two leg portions and facing the outer surface side in the longitudinal direction of the automobile of the bumper system, and at least one leg portion of the two leg portions includes a buckling inductive portion that serves as a starting point of the buckling that is caused in at least one leg portion when the spanning portion receives the impact load.

According to this constitution, the starting point of the buckling is controlled by the buckling inductive portion such that the fluctuation of the buckling position of the ribs, that is, two legs provided in the bumper absorber, can be suppressed. Therefore, stable impact absorption performance can be obtained.

The inner side surfaces, which mutually face between the upper side leg portion and the lower side leg portion of at least one leg portion including the buckling inductive portion, incline obliquely upward or obliquely downward in the longitudinal direction of the automobile. The buckling inductive portion is preferably an angular transition portion formed so that the angle of inclination between the inner side surfaces at a portion from the root of at least one leg portion to the buckling inductive portion is different from the angle of inclination between the inner side surfaces at a portion from the buckling inductive portion to the end of the at least one leg portion.

According to this constitution, it is possible to easily form the buckling inductive portion without giving any specific processing.

The inner side surfaces of at least one leg portion including the buckling inductive portion are more preferably inclined so as to be away from the center of a vertical direction between the two portions from the root toward the end. Further, it is more preferable that the angle of inclination between the inner side surfaces at the portion from the root to the buckling inductive portion is larger than the angle of inclination between these inner side surfaces at the portion from the buckling inductive portion to the end.

According to this constitution, bending in a direction to be away from another leg portion is induced in at least one leg portion including the buckling inductive portion. Accordingly, the two leg portions are prevented from interfering with each other, thereby making it possible to prevent the impact absorption performance from deteriorating and to prevent the reaction force toward the collided object from increasing.

More preferably, the thickness of at least one leg portion including the buckling inductive portion at the portion from the buckling inductive portion to the root becomes gradually thicker from the buckling inductive portion toward the root.

According to this constitution, the thickness of at least one leg portion including the buckling inductive portion becomes gradually thicker toward the collided object side, so that the response load can be dispersed in a wide range in a height direction of the impact surface. Thus, the bending moment applied to the collided object can be reduced, and the damage to the legs and the like of the pedestrian can be suppressed. In addition, the collision initial stage in a load-displacement curve quickly rises, and an amount of impact absorption is increased.

Furthermore, it is more preferable that the thickness of at least one leg portion including the buckling inductive portion at the portion from the buckling inductive portion to the end is held to be constant.

According to this constitution, the thickness at the end side of the legs including the buckling inductive portion is constant. Therefore, no stress concentration occurs at the end, whereby the occurrence of the buckling at the vicinity of the end is suppressed, and preferable impact absorption performance can be stably obtained.

Moreover, it is more preferable that at the portion from the root to the buckling inductive portion of at least one leg portion including the buckling inductive portion, the inner side surfaces, which mutually face between the upper side leg portion and the lower side leg portion, and each of outer side surfaces on an opposite side of each of the inner side surfaces are inclined so as to be away from the center of the vertical direction between the upper side leg portion and the lower side leg portion from the root toward the end. Further, the angle of inclination between the inner side surfaces is larger than the angle of inclination between the outer side surfaces.

According to this constitution, the leg portions including the buckling inductive portion stably bend to the outer side, thereby preventing the two leg portions from interfering with each other. Consequently, the impact absorption performance is prevented from deteriorating or the reaction force toward the collided object is prevented from becoming strong.

According to the bumper absorber of the present invention, the fluctuation of the buckling (i.e., the position that serves as a starting point of the bending) of the leg portions including the buckling inductive portion can be suppressed. Accordingly, ability of the bumper absorber to absorb the impact energy can be enhanced.

DETAILED DESCRIPTION OF THE PREFERRED EMBODIMENTS

Hereinafter, the preferred embodiments of the present invention will be explained below with reference to the accompanying drawings.

Figure 2:
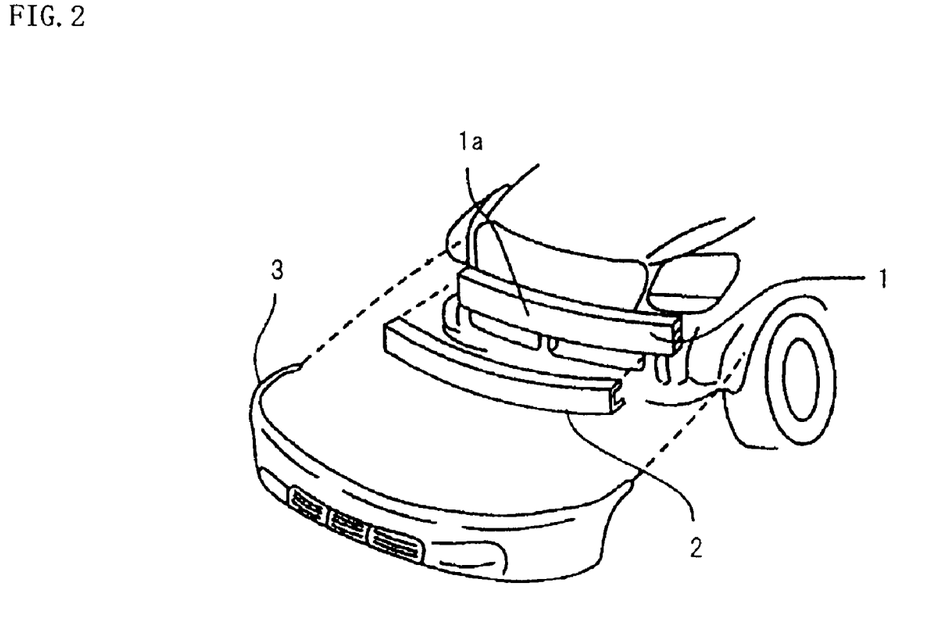
FIG. 2 is an exploded perspective view showing a bumper system applied with a bumper absorber of one embodiment of the present invention.
Figure 3:
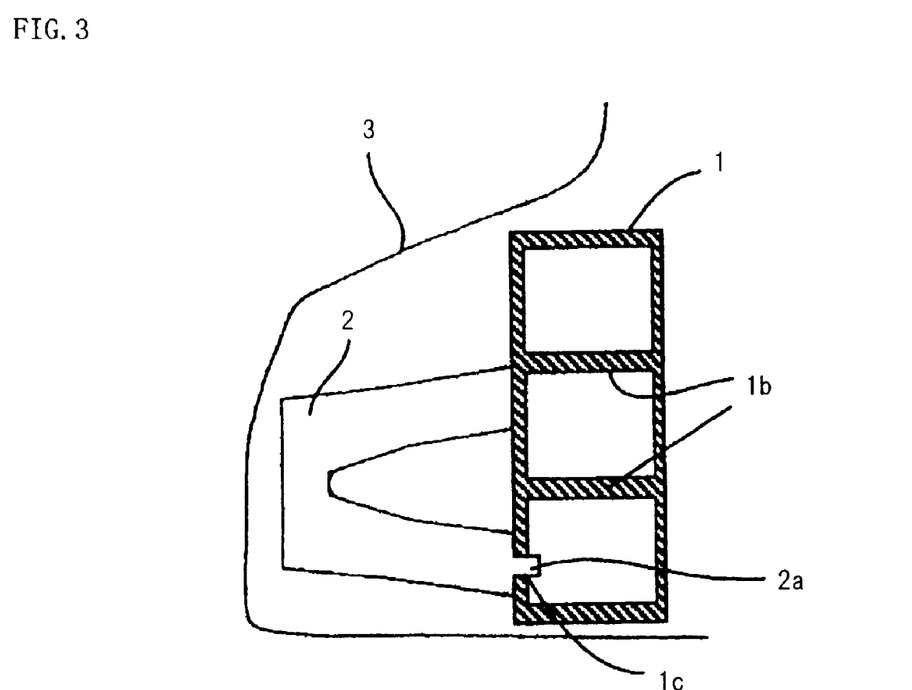
FIG. 3 is a cross sectional view of the bumper system of FIG. 2 along a longitudinal direction of an automobile.

A schematic view of a bumper system of one embodiment of the present invention is shown in FIGS. 2 and 3. FIG. 2 is an exploded perspective view of the bumper system of the automobile front side, and FIG. 3 is a cross sectional view along the longitudinal direction of the bumper system in an assembled state. The bumper absorber of the present invention is also applicable to the bumper system provided in the rear side of the automobile. In addition, in order to simplify explanation of the bumper absorber, hereinafter, the bumper absorber of the front side of the automobile will be described as an example.

The bumper system includes bumper reinforce 1, bumper absorber 2, and bumper fascia 3. Bumper reinforce 1 is fitted to the automobile body of the automobile. Bumper absorber 2 is disposed so as to abut on front surface 1a of bumper reinforce 1. Bumper fascia 3 covers bumper reinforce 1 and bumper absorber 2.

Bumper reinforce 1 is made of steel, and extends horizontally over the width of the automobile, and has a hollow cylindrical structure having a substantially rectangular parallelepiped outer shape. A hollow interior of bumper reinforce 1 includes partition wall 1b for reinforcing. The structure of bumper reinforce 1 is not limited to this form, and by having such a structure, while the structure is relatively light in weight, the required strength can be given to the structure. Accordingly, while an increase in the weight of the automobile body is suppressed to the minimum, the automobile body can be reinforced and protected.

Bumper absorber 2 is formed by a raw material excellent in impact absorption. As such a raw material, so-called bead foam, blow compact and the like are preferable. The bead foam is formed such that effervescent resin particles made of thermoplastic resins are foamed inside the cavity of a forming die so as to be formed into a desired shape, and such that the effervescent resin particles are fusion-bonded among adjacent resin particles and are unified. As thermoplastic resins, polypropylene, polyethylene, polystyrene, polystyrene/polyethylene copolymer, and the like are suitable. The blow compact is formed such that molten resins are ejected, whereby the molten resins have the shape of a hollow sheet to form a hollow compact, while blowing air inside the molten resins.

Bumper reinforce 1 also functions as a mount for bumper absorber 2 and as a pedestal when bumper absorber 2 is crushed and absorbs impact. In order to fix bumper absorber 2 to bumper reinforce 1, engaging projection 2*a* is formed on bumper absorber 2, and engaging hole 1*c* is formed on front surface 1*a* of bumper reinforce 1. Only one element of Engaging projection 2*a* and only one element of engaging hole 1*c* are visible in FIG. 3. However, a plurality of pieces are actually provided spaced apart in the width direction of the automobile body, and are provided at the positions mutually corresponding to, and are engaged with each other.

It is preferable that engaging projection 2*a* has an outer shape that is slightly larger than the inner diameter of engaging hole 1*c*. By having such a constitution, engaging projection 2*a* is just pushed into and engaged with engaging hole 1*c*, whereby bumper absorber 2 can be fixed by the frictional force, and the mounting and fixing of bumper absorber 2 can be easily performed.

When bumper fascia 3 is seen from the outside of the automobile, bumper fascia 3 covers and conceals bumper reinforce 1 and bumper absorber 2. Accordingly, bumper fascia 3 functions to give the bumper system a preferable design as a constitution member on the front side of the automobile. Further, bumper fascia 3 also has a function that protects bumper absorber 2 from the external environment.

When bumper fascia 3 receives the impact load, bumper fascia 3 is preferably deformed or broken by a relatively small load. Thus, the impact load can be easily transmitted to bumper absorber 2. Moreover, the impact absorption function of bumper absorber 2 can be prevented from being inhibited by bumper fascia 3. For this reason, as bumper fascia 3, a thin compact formed by synthetic resins being press-molded or injection-molded is preferably used.

Figure 4:
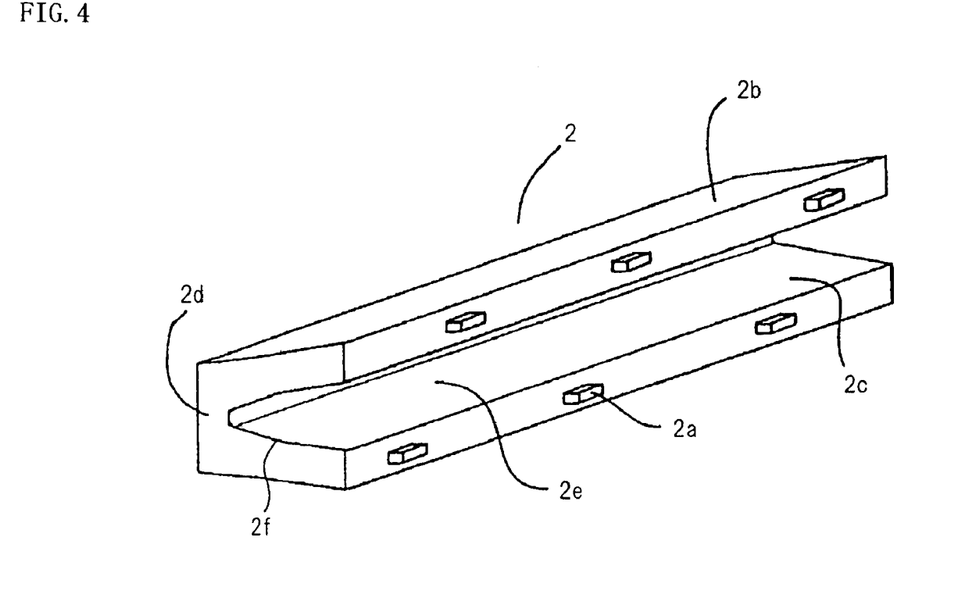
FIG. 4 is a perspective view showing the bumper absorber of FIG. 2.
Figure 5:
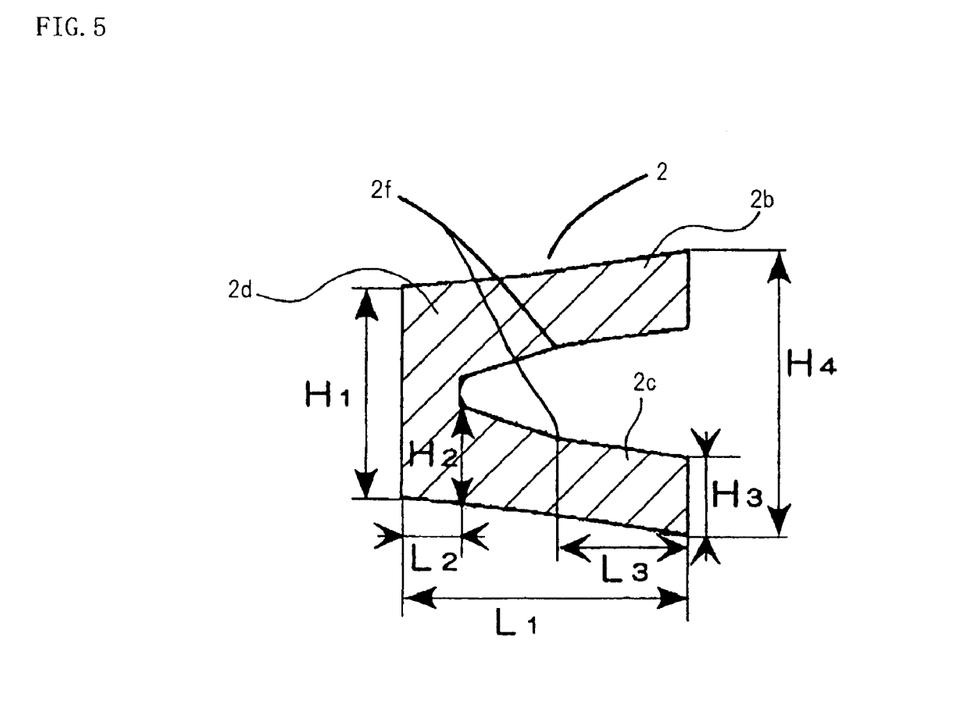
FIG. 5 is a cross sectional view of the bumper absorber of FIG. 2 along the longitudinal direction of the automobile.

Next, referring to FIGS. 4 and 5, the structure of bumper absorber 2 of the present embodiment will be described more in detail. FIG. 4 is a perspective view of bumper absorber 2, and FIG. 5 is a cross sectional view along the longitudinal direction of the automobile.

Bumper absorber 2 extends in the width direction of the automobile, and has a length that is nearly equal to the width of the automobile. The cross sectional shape of the bumper absorber along the longitudinal direction of the automobile is approximately uniform in the width direction of the automobile and the whole of the bumper absorber is ordinarily formed integrally.

Bumper absorber 2 of the present embodiment includes upper leg (upper side leg portion) 2*b*, lower leg (lower side leg portion) 2*c*, and spanning portion 2*d*. Upper leg 2*b* and lower leg 2*c* extend in the longitudinal direction of the automobile when seen from the cross section along the longitudinal direction. Spanning portion 2*d* connects the root of upper leg 2*b* and the root of lower leg 2*c*, and faces bumper fascia 3. The front surface of spanning portion 2*d* functions as an impact surface that receives the impact from the collided object at the time of crash.

Engaging projections 2*a* as described above are formed integrally on upper leg 2*b* and lower leg 2*c* so as to be projected from the ends of these legs. Engaging projection 2*a* has an approximately rectangular shape of approximately 5 to 20 mm in thickness and 20 to 40 mm in height. Engaging projection 2*a* is disposed alternatively in upper leg 2*b* and lower leg 2*c* at predetermined intervals in the longitudinal direction (the widthwise direction of the automobile) of bumper absorber 2.

In bumper absorber 2 of the present embodiment as described above, the impact load received by spanning portion 2*d* is transmitted to upper leg 2*b* and lower leg 2*c*. As a result, the load is applied to upper leg 2*b* and lower leg 2*c* in the longitudinal direction of the automobile, and upper leg 2*b* and lower leg 2*c* are buckled so as to cause bending deformation, whereby upper leg 2*b* and lower leg 2*c* are crushed in the longitudinal direction. In such a process, the reaction force transits toward the collided object, that is, the response load transits as shown in the load-displacement curve of FIG. 8, which will be described later. Namely, in the initial stage where the displacement stroke is small, mainly during the displacement stroke corresponding to the progress of the compression deformation of bumper absorber 2, the response load increases approximately in proportion to the displacement stroke. After that, when the displacement stroke becomes larger, mainly during the displacement stroke corresponding to the progress of the buckling, the response load becomes approximately constant. When the displacement stroke becomes much larger, the response load becomes rapidly larger. This is equivalent to the limit of energy absorbed by bumper absorber 2.

In this manner, upper leg 2*b* and lower leg 2*c* are constituted to cause the buckling, so that the response load can be made approximately uniform at the desired value no more than the rated value during the predetermined displacement stroke. Accordingly, while the force applied to the collided object such as the legs of the pedestrian does not become excessively strong, the impact energy can be absorbed by bumper absorber 2. More specifically, the excellent impact absorption characteristics in suppressing the damages to the collided objects can be obtained.

At this time, in bumper absorber 2 of the present embodiment, a portion between upper leg 2*b* and lower leg 2*c* on a side of bumper reinforce 1 in the direction of spanning portion 2*d* is hollow portion 2*e*. In this structure, since the thicknesses of upper leg 2*b* and lower leg 2*c* and the thickness of spanning portion 2*d* are set in the predetermined range, the size of hollow portion 2*e* can be appropriately set so that the space in which upper leg 2*b* and lower leg 2*c* are buckled and bent can be secured. Therefore, upper leg 2*b* and lower leg 2*c* can be prevented from interfering with each other so as to make the response load unstable when upper leg 2*b* and lower leg 2*c* are bent, and excellent impact absorption performance can be stably obtained.

Furthermore, in bumper absorber 2 of the present embodiment, an angle of inclination between the mutually facing inner side surfaces of upper leg 2*b* and lower leg 2*c* in the cross sectional shape along the longitudinal direction of the automobile is made different at the end side and the root side. Therefore, an angular transition portion in which the angle of inclination changes in the vicinity of the centers of upper leg 2*b* and lower leg 2*c* can be allowed to function as buckling inductive portion 2*f* that serves as a starting point of the bending caused by the buckling. Since such buckling inductive portion 2f is provided, when bumper absorber 2 receives the impact load, a position in which the buckling is caused between the root and the end of upper leg 2b and lower leg 2c can be controlled, and good impact absorption performance can be stably obtained. Namely, the bending position caused by the buckling is taken as a predetermined position, whereby the displacement stroke and the response load caused by the buckling can be controlled so as to be constant values with which good impact absorption performance is obtained.

Further, the inner side surfaces of upper leg 2b and lower leg 2c are inclined so as to be away from the center of the vertical direction of bumper absorber 2 toward bumper reinforce 1 at the portion from the root to buckling inductive portion 2f as well as at the portion from buckling inductive portion 2f to the end of each of upper leg 2b and lower leg 2c. More specifically, the inner side surface of upper leg 2b is inclined upward toward bumper reinforce 1, and the inner side surface of lower leg 2c is inclined downward toward bumper reinforce 1. The angle of inclination at the portions from the root to buckling inductive portions 2f of the inner side surfaces of upper leg 2b and lower leg 2c is larger than the angle of inclination at the portion from buckling inductive portion 2f to the end of each of upper leg 2b and lower leg 2c. By having such a constitution, when bumper absorber 2 receives the impact load, the bending direction of these legs can be controlled so that upper leg 2b and lower leg 2c are bent in a direction in which these legs are away from each other. By controlling the bending direction in this manner, upper leg 2b and lower leg 2c are prevented from interfering with each other, and a stable and constant response load can be obtained during the time in which the buckling progresses.

Moreover, the portions from the root to buckling inductive portions 2f of upper leg 2B and lower leg 2c become gradually thicker from buckling inductive portions 2f toward the root. According to this constitution, the thickness in the vicinity of the impact surface is increased, so that the response load at the initial stage of impact in the load-displacement curve of bumper absorber 2 quickly rises when bumper absorber 2 receives the impact load. Accordingly, the amount of impact absorption can be increased. In addition, the thickness of the portion, which supports spanning portion 2d between upper leg 2b and lower leg 2c that are connected with spanning portion 2d constituting the impact surface, becomes large. As a result, an area in which a relatively large response load is generated on the impact surface can be dispersed in a wide range of a height direction of the impact surface. Therefore, particularly, when considering the case where thighs of the pedestrian collide with the bumper system, the bending moment applied to the thighs is reduced. Consequently, damage to the thighs can be suppressed.

The thicknesses from buckling inductive portions 2f to the ends of upper leg 2b and lower leg 2c are approximately constant. According to this constitution, the following phenomena can be suppressed: the stress concentration is generated in the vicinity of the ends of upper leg 2b and lower leg 2c, and the impact absorption performance of bumper absorber 2 is lowered. Further, the starting point of the bending is stabilized so as to become buckling inductive portion 2f.

Furthermore, not only the inner side surfaces but also the outer side surfaces from the roots to buckling inductive portions 2f of upper leg 2b and lower leg 2c are inclined so as to be away from the center of the vertical direction of bumper absorber 2 toward bumper reinforce 1. On these surfaces, the angle of inclination of the inner side surface is larger than the angle of inclination of the outer side surface. According to this constitution, when the impact load is applied, the portions from the roots to buckling inductive portions 2f of upper leg 2b and lower leg 2c are displaced so as to be away from each other. Therefore, buckling inductive portions 2f of upper leg 2b and lower leg 2c are also displaced so as to be away from each other. As a result, the direction in which upper leg 2b and lower leg 2c are folded can be facilitated to be turned into the direction heading towards the outside from the center of the vertical direction of bumper absorber 2. Accordingly, as described above, upper leg 2b and lower leg 2c are prevented from interfering with each other, and a stable and constant response load can be obtained during the time in which the buckling progresses.

Here, impact surface height $H_1$ of spanning portion 2d is preferably 70 to 90% of $H_4$ of the back surface height that corresponds to the distance between the ends of upper leg 2b and lower leg 2c, and is more preferably 75 to 85%. When the impact surface height $H_1$ is not less than this lower limit, the impact surface can be made relatively wider. Moreover, by dispersing the response load on the impact surface side, the bending moment applied to the collided object is reduced so that the injuries to the legs and the like of the pedestrian can be suppressed. Meanwhile, when the impact surface height $H_1$ is not more than the upper limit of the back surface height, a large draught angle can be secured when the bumper absorber is separated from a forming die when bumper absorber 2 is manufactured. Therefore, the molding of the bumper absorber becomes easy.

Thickness $H_2$ of the root portions of upper leg 2b and lower leg 2c is preferably in the range of 30 to 50% of a net leg height ($L_1$-$L_2$), and is more preferably 35 to 45%. When the thickness $H_2$ of the root portions is not less than this lower limit, the folding of upper leg 2b and lower leg 2c from the root portions can be prevented before the impact energy is sufficiently absorbed. Further, the response load at the initial stage of impact can be quickly raised, and the amount of impact absorption can be increased. When thickness $H_2$ of the root portions is not more than the upper limit of this net leg height, the displacement stroke can be prevented from becoming small until the approximately constant response load cannot be obtained and the response load rapidly begin to be large.

Thickness $H_3$ of the portions from the roots to buckling inductive portions 2f of upper leg 2b and lower leg 2c is preferably 20 to 40% of a net leg height ($L_1$-$L_2$), and is more preferably 25 to 35%. When thickness $H_3$ of these portions is not less than this lower limit, upper leg 2b and lower leg 2c are broken up accompanied with bending deformation, whereby the response load can be prevented from becoming small. Further, the impact absorption performance is prevented from deteriorating. When thickness $H_3$ is not more than the upper limit of the net leg height, the buckling can be allowed to begin at the time of an appropriate displacement stroke. This constitution can prevent the increase of the response load, caused by compression deformation, from becoming excessively large.

Thickness $L_2$ of spanning portion 2d is preferably in the range of 10 to 30% of the thickness $L_1$ in the longitudinal direction of bumper absorber 2, and is more preferably 15 to 25%. When the thickness $L_2$ of spanning portion 2d is not less than this lower limit, the initial stage of impact in the load-displacement curve can be quickly raised. When thickness $L_2$ of spanning portion 2d is not more than this upper limit, the reaction force toward the collided object such as the legs and the like of the pedestrian can be prevented from becoming excessively large.

Length $L_3$ from buckling inductive portions 2f to the ends of upper leg 2b and lower leg 2c is preferably in the range of 40 to 60% of the net leg height ($L_1$-$L_2$) of bumper absorber 2, and is more preferably in the range of 45 to 55%. When length $L_3$ from buckling inductive portions 2f to the ends of upper leg 2b and lower leg 2c is in this range, buckling inductive portions 2f are located in the vicinity of the centers of upper leg 2b and lower leg 2c. Therefore, the displacement stroke that accompanies the buckling can be secured at a maximum. As a result, the displacement stroke range in which the response load is approximately constant can be secured at a maximum, thereby enabling improvement of the impact absorption performance of bumper absorber 2.

The constitution of bumper absorber 2 of the present embodiment as described above exemplifies the present invention, and can be variously modified in the scope of the present invention. For example, a preferred example in the present embodiment has been shown, in which buckling inductive portions 2f are constituted by the portions at which the angle of inclination between the inner side surfaces of upper leg 2b and lower leg 2c transits. However, buckling inductive portions 2f may be other various structures capable of being set as the starting point of the buckling. The constitution may be such that buckling inductive portion 2f is provided in either upper leg 2b or lower leg 2c. In addition, in the example as shown in FIG. 5, though the outer side surfaces of upper leg 2b and lower leg 2c are constituted to have a uniform inclination, the inclination of the outer side surfaces may be changed.

In particular, in the case of a Sport-Utility Vehicle (SUV) that has a high vehicle height and that requires driving performance on sloping and rough roads, bumper fascia 3 comes in contact with the road surface of a sloping road that rises sharply. To suppress this contact, a so-called approach angle is sometimes provided, which is inclined upward in a direction that separates the bottom of bumper fascia 3 from the automobile body. When such an approach angle is provided, in order to match the shape of bumper absorber 2 with the outer shape of bumper fascia 3, the lower portion of spanning portion 2d and the vicinity of the root of upper leg 2b and lower leg 2c may be configured to be notched. At this time, as described above, it is particularly preferable that the thickness of the portions from the roots to buckling inductive portions 2f of upper leg 2b and lower leg 2c be kept gradually thick from the end toward the root. Accordingly, even when a notch is provided for the approach angle, components having sufficient volume can be secured in the vicinity of the impact surface in bumper absorber 2. Consequently, the absorption performance of the impact energy can be secured. Moreover, as described above, when impact surface height $H_1$ of spanning portion 2d is made smaller than back surface height $H_4$, and when impact surface height $H_1$ is preferably made not more than 90% or more preferably not more than 85% of back surface height $H_4$, the portion to be notched for the approach angle can be suppressed to be small, which is preferable.

Furthermore, the number, the disposition, the shape and the like of engaging projection 2a and engaging hole 1c can be appropriately adjusted according to the type of the automobile, so that bumper absorber 2 can be appropriately fixed to bumper reinforce 1. In particular, engaging projection 2a is preferably made into a tapered shape, and according to this constitution, the engagement of engaging projection 2a with engaging hole 1c can be made much easier.

EXAMPLES

As examples of material of and comparative examples of the bumper absorber of the present embodiment, the following material was used: This material is made by foaming and molding polypropylene resin foam particle (product name "P-BLOCK" (Registered Trade Mark) manufactured by JSP Corporation) with a foaming magnification ratio: 20 times.

Figure 6A:
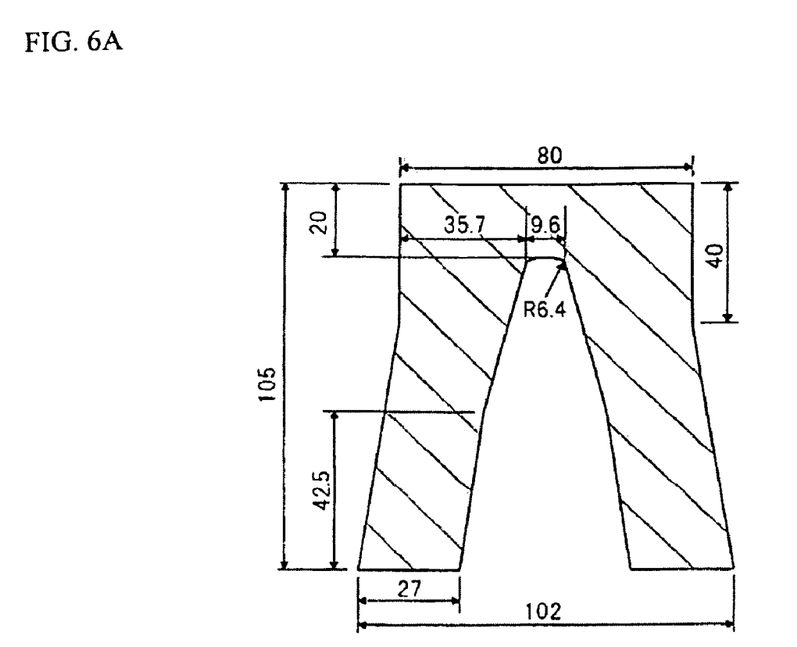
FIGS. 6A to 6F are cross sectional views showing examples and comparative examples of the bumper absorber.
Figure 6B:
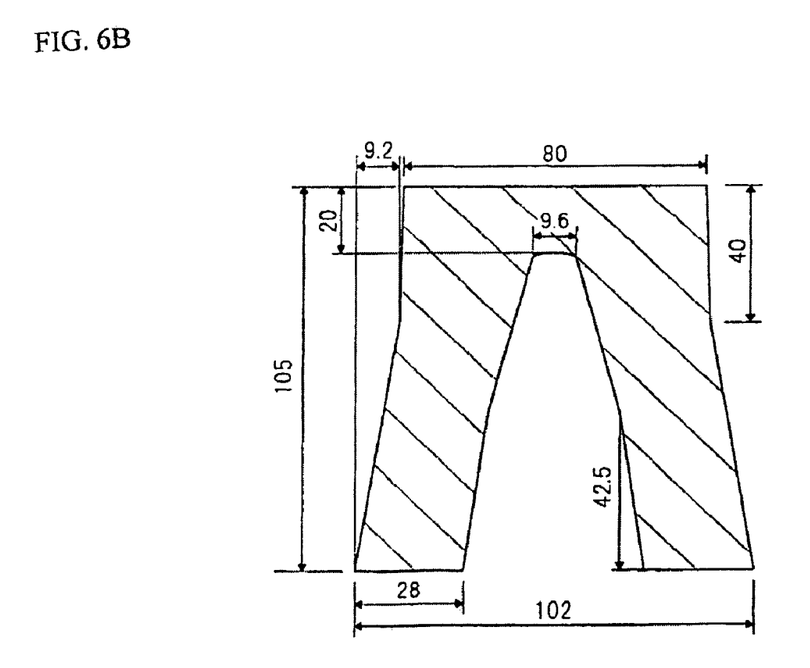

As examples 1 and 2, as shown in FIGS. 6A and 6B, respectively, samples of the bumper absorber having the structure corresponding to the above described embodiment of the present invention were prepared. Further, as comparative examples 1 to 4, as shown in FIGS. 6C to 6F, respectively, samples of the bumper absorber that does not include buckling inductive portion 2f were prepared.

Hereinafter, the dimension of each portion of examples 1 and 2, and comparative examples 3 to 6 will be shown. In addition, the size W (i.e., the length in the width direction of the automobile) in the longitudinal direction of the samples of examples 1 and 2, and comparative examples 1 to 4 was all taken as 300 mm.

Example 1

$H_1$: 80 mm, $H_2$: 35.7 mm, $H_3$: 27 mm, $H_4$: 102 mm, $L_1$: 105 mm, $L_2$: 20 mm, $L_3$: 42.5 mm (see FIG. 6A)

Example 2

$H_1$: 80 mm, $H_2$: 35.7 mm, $H_3$: 28 mm, $H_4$: 102 mm, $L_1$: 105 mm, $L_2$: 20 mm, $L_3$: 42.5 mm (see FIG. 6B)

Comparative Example 1

Figure 6C:
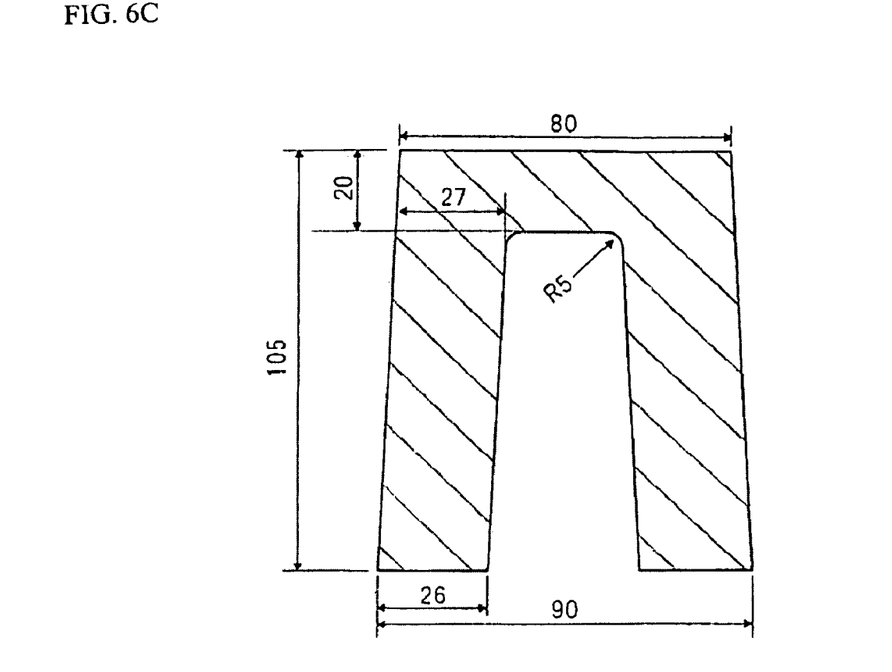

$H_1$: 80 mm, $H_2$: 27 mm, $H_3$: 26 mm, $H_4$: 90 mm, $L_1$: 105 mm, $L_2$: 20 mm (see FIG. 6C)

Comparative Example 2

Figure 6D:
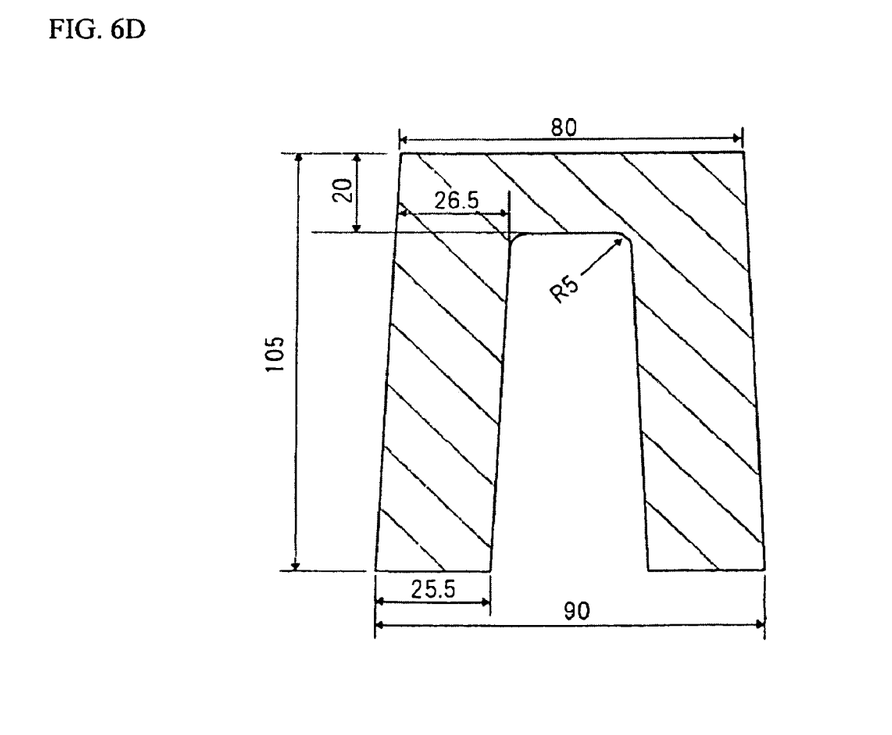

$H_1$: 80 mm, $H_2$: 26.5 mm, $H_3$: 25.5 mm, $H_4$: 90 mm, $L_1$: 105 mm, $L_2$: 20 mm (see FIG. 6D)

Comparative Example 3

Figure 6E:
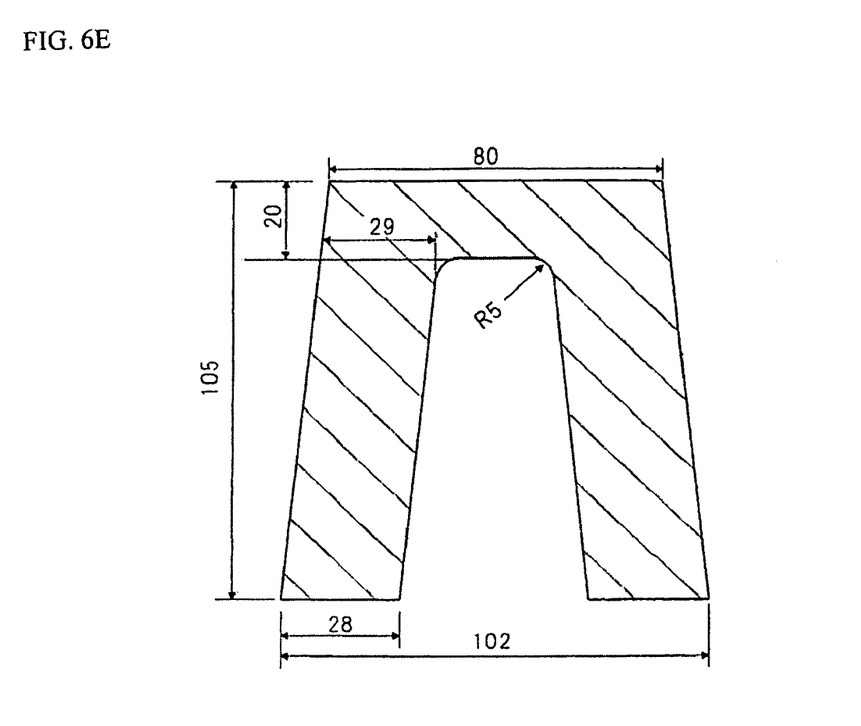

$H_1$: 80 mm, $H_2$: 29 mm, $H_3$: 28 mm, $H_4$: 102 mm, $L_1$: 105 mm, $L_2$: 20 mm (see FIG. 6E)

Comparative Example 4

Figure 6F:
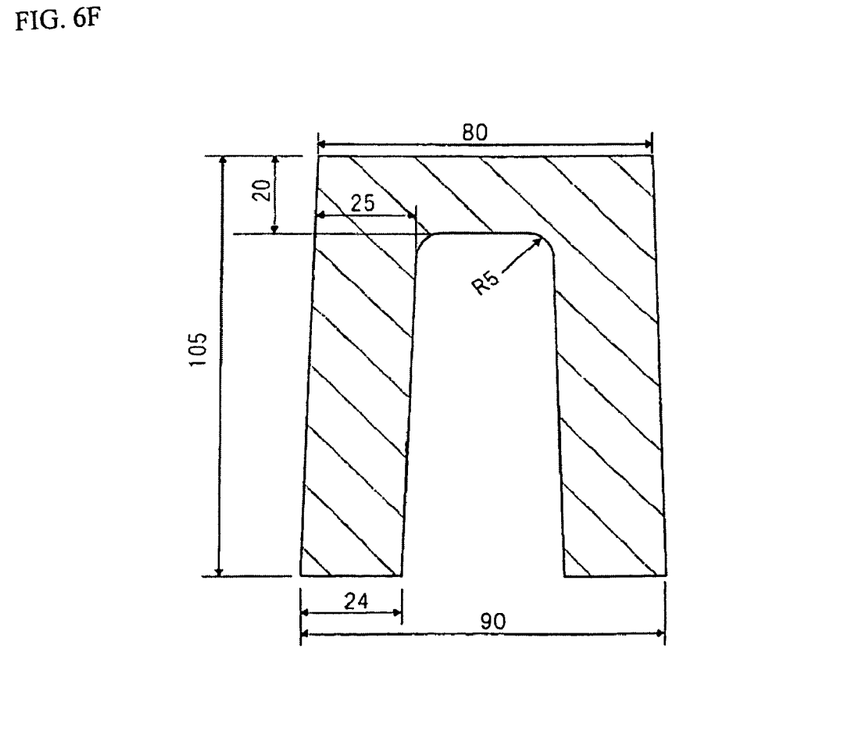

$H_1$: 80 mm, $H_2$: 25 mm, $H_3$: 24 mm, $H_4$: 90 mm, $L_1$: 105 mm, $L_2$: 20 mm (see FIG. 6F)

(Impact Testing)

Figure 7:
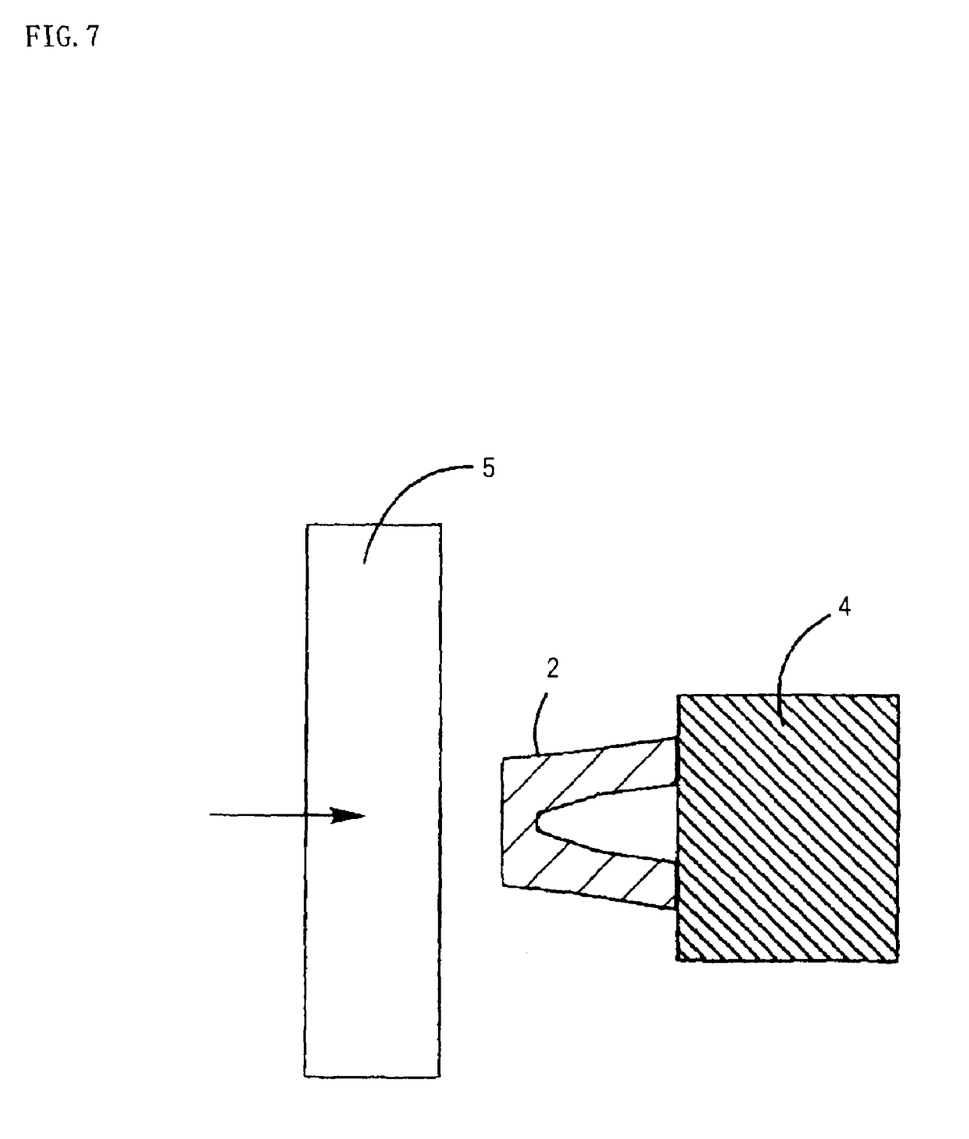
FIG. 7 is a schematic view showing a method of impact testing.

Next, referring to FIG. 7, an impact testing method of the bumper absorber of the present invention will be described.

For the bumper absorbers of examples 1 and 2 and comparative examples 1 to 4, the impact testing was conducted in a single state of the bumper absorbers. As shown in FIG. 7, each of the bumper absorbers was fitted to rectangular parallelepiped receiving element 4 so that the end of upper leg 2b and the end of lower leg 2c came into contact with receiving element 4. As the arrow of FIG. 7 shows, with the axial line of impactor 5 having an attitude oriented 90 degrees in the longitudinal direction of bumper absorber 2, impactor 5 was made to collide with bumper absorber 2 at a speed of 25 km/h from the side of spanning portion 2d of bumper absorber 2. As impactor 5, a round bar type impactor made of steel S45C and having a 75 mm diameter× a 300 mm length and a 23.06 kg weight was used. The relationship between the displacement and the response load of bumper absorber 2 at this time was observed and measured.

(Evaluation)

Figure 8:
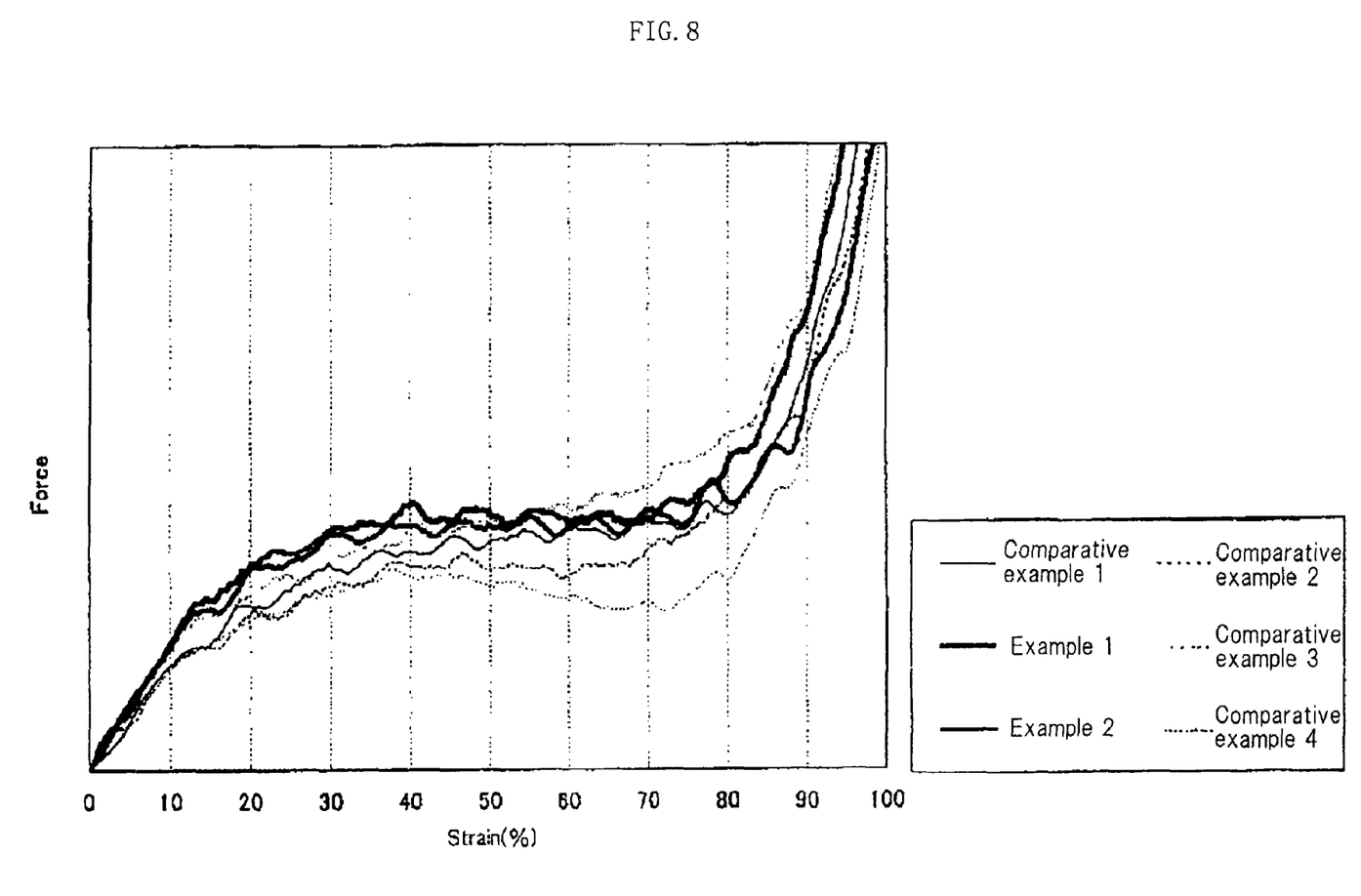
FIG. 8 is a load-displacement curve showing a result of the impact testing.

The result of the above described impact testing is shown in FIG. 8. FIG. 8 is a load-displacement curve plotting the transition of the response load for the displacement stroke.

It is apparent that the load-displacement curves of comparative examples 1 to 4, as compared with examples 1 and 2, show that the load at the initial stage of impact slowly increases, or that the response load gradually increases in the area where the response load is planned to be constant, and that the response load slightly decreases.

Meanwhile, it is apparent that both of the load-displacement curves of examples 1 and 2 show that the increase of the response load at the initial stage of impact is quick, and that the area where the response load is approximately constant is stably obtained, and that this area is wide. It is considered that the increase at the initial stage of impact as compared with comparative examples is quick because upper leg 2b and lower leg 2c are in a tapered shape in which the thicknesses of these legs become gradually thicker from the leg root to the buckling inductive portion. Further, it is considered that the area with the constant load is wide because it is thought that the buckling inductive portion is provided, whereby the starting point of the buckling becomes an appropriate position, and upper leg 2b and lower leg 2c are reliably folded outside.

From this result, it is apparent that in examples 1 and 2 as compared with comparative examples, the response load can be made stable so that the value of the response load is not more than the predetermined value over the wide displacement stroke range. Furthermore, it is apparent that excellent absorption characteristics in which the absorption amount of the impact energy is large can be obtained.

This application is based upon and claims the benefit of priority from Japanese Patent Application No. 2007-51415, filed on Mar. 1, 2007, the disclosure of which is expressly incorporated herein in its entirety by reference.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A bumper absorber disposed in a bumper system of an automobile, the bumper absorber comprising:

an upper side leg portion and a lower side leg portion, each of which extends in a longitudinal direction of the automobile; and a spanning portion connecting the upper side leg portion and the lower side leg portion, and facing an outer surface side of the bumper system in the longitudinal direction of the automobile, wherein at least one leg portion of the upper side leg portion and the lower side leg portion includes a buckling inductive portion, and the buckling inductive portion serves as a starting point of the buckling that is caused in said at least one leg portion when the spanning portion receives an impact load, wherein inner side surfaces, which mutually face between the upper side leg portion and the lower side leg portion of said at least one leg portion including the buckling inductive portion, incline obliquely upward or obliquely downward in the longitudinal direction of the automobile, and the buckling inductive portion is an angular transition portion disposed on said at least one leg portion so that an angle of inclination between the inner side surfaces at a portion from a root of said at least one leg portion to the buckling inductive portion is different from an angle of inclination between the inner side surfaces at a portion from the buckling inductive portion to an end of said at least one leg portion.

2. The bumper absorber according to claim 1, wherein the inner side surfaces are inclined so as to be away from a center of a vertical direction between the upper side leg portion and the lower side leg portion from the root toward the end, and the angle of inclination between the inner side surfaces at the portion from the root to the buckling inductive portion is larger than the angle of inclination between the inner side surfaces at the portion from the buckling inductive portion toward the end.

3. The bumper absorber according to claim 1, wherein a thickness of said at least one leg portion, which includes the buckling inductive portion, at the portion from the buckling inductive portion to the root becomes gradually thicker from the buckling inductive portion toward the root.

4. The bumper absorber according to claim 1, wherein a thickness of said at least one leg portion including the buckling inductive portion at the portion from the buckling inductive portion to the end is held to be constant.

5. The bumper absorber according to claim 1, wherein at the portion from the root to the buckling inductive portion of said at least one leg portion including the buckling inductive portion, the inner side surfaces, which mutually face between the upper side leg portion and the lower side leg portion, and each of outer side surfaces on an opposite side of each of the inner side surfaces are inclined so as to be away from the center of the vertical direction between the upper side leg portion and the lower side leg portion from the root toward the end, and the angle of inclination between the inner side surfaces is larger than the angle of inclination between the outer side surfaces.

* * * * *